June 7, 1932.  C. W. VAN RANST  1,861,463
HEADLIGHT MOUNTING FOR AUTOMOBILES
Filed May 31, 1929
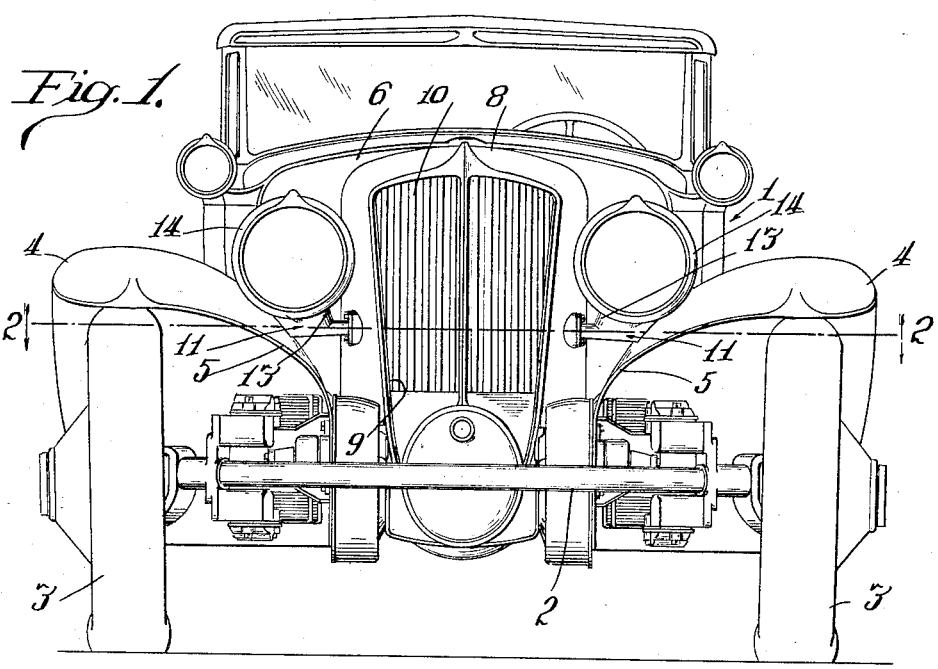
Fig. 1.
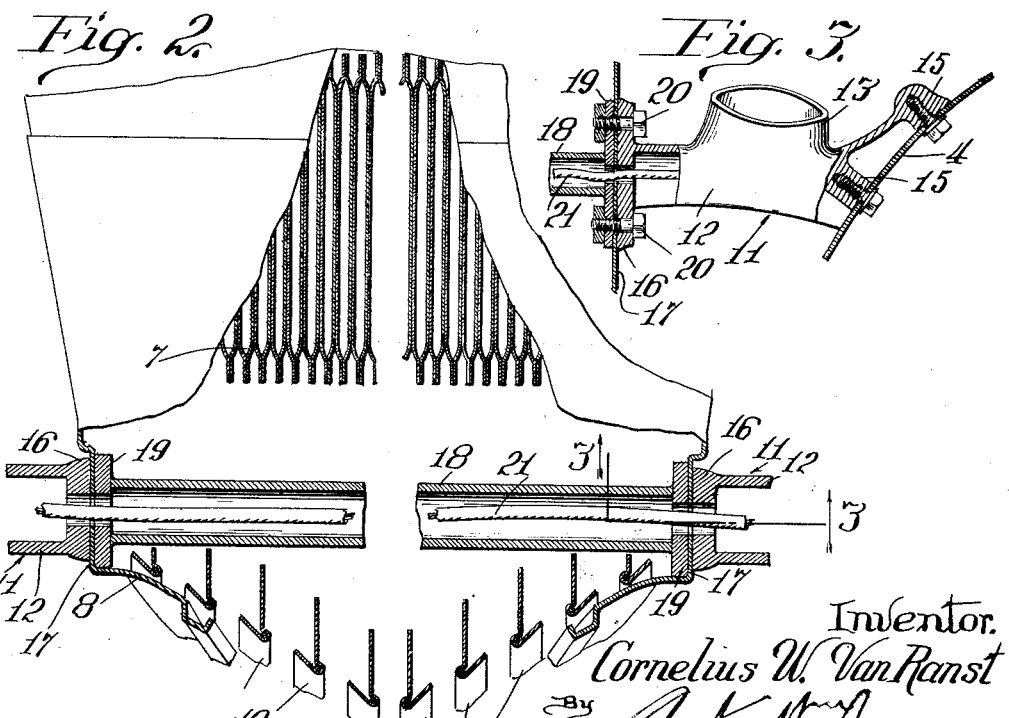
Fig. 2.
Fig. 3.
Inventor.
Cornelius W. Van Ranst
By Arthur W. Phelan
Attorney.

Patented June 7, 1932

1,861,463

UNITED STATES PATENT OFFICE

CORNELIUS W. VAN RANST, OF AUBURN, INDIANA, ASSIGNOR, BY MESNE ASSIGNMENTS, TO MANNING & CO., OF CHICAGO, ILLINOIS, A CORPORATION OF ILLINOIS

HEADLIGHT MOUNTING FOR AUTOMOBILES

Application filed May 31, 1929. Serial No. 367,409.

This invention relates to improvements in headlight mountings for automobiles and it consists of the matters hereinafter described and more particularly pointed out in the appended claims.

The primary object of the invention is to provide an improved mounting for the headlights of an automobile, and one wherein the front fenders of the automobile are connected together by means of headlight supporting brackets and a tie rod, which rod is not only ingeniously concealed but is employed as a conduit for the wiring for said headlights.

Another object of the invention is to provide a structure of this kind which includes a tie rod extending through the radiator shell in a manner to rigidly hold the shell against vibration and to connect it to the fenders which add their rigidity in securing the shell in position.

These objects of the invention as well as others, together with the many advantages thereof, will more fully appear as I proceed with my specification.

In the drawing:

Fig. 1 is a view in front elevation of an automobile embodying my improved headlight mounting.

Fig. 2 is a horizontal sectional detail view of the same on an enlarged scale as taken on the line 2—2 of Fig. 1.

Fig. 3 is a vertical detail sectional view as taken on the line 3—3 of Fig. 2.

The invention is herein illustrated and will be herein described as embodied in an automobile of the front wheel drive type but I do not wish to limit myself thereto as the invention is also applicable to automobiles of the rear drive type as is readily apparent.

Referring now in detail to that embodiment of the invention illustrated in the accompanying drawing: 1 indicates as a whole the body of the automobile which is spring mounted at the front end from the axle 2. At each end of said axle is a driven front wheel 3, which is disposed beneath an associated fender 4 supported from the body by the usual apron part 5. A hood 6 is disposed between the body 1 and at the front end of the hood is a radiator which includes a core 7 and a shell 8. The shell, which is of substantially a V type, is open at its front as at 9 and in said open front are shutter vanes or louvers 10 which may be moved to either close or expose the open front of the shell. In this respect it is pointed out that the front of the shell is spaced a substantial distance in front of the core as best shown in Fig. 2.

11—11 indicates the lamp or headlight supporting brackets, one disposed between each side of the shell and associated fender apron part 5. Said bracket has a hollow, horizontally disposed base portion 12 and an upstanding portion 13 to which is secured in any suitable manner, a headlight casing 14. At the outer end of the base of each bracket are bosses 15 for engagement with and attachment to the associated fender apron 5 and at the inner end of the base of each bracket is a vertically disposed flange 16 adapted to be engaged with the outer surface of a flattened seat 17 formed one at each side of the shell at a point in advance of the core as best shown in Fig. 2.

18 indicates a tubular bar or rod having end flanges 19—19, one engaged against the inner surface of each flattened seat 17 of the radiator shell. Bolts 20—20 with associated nuts extend through the flanges 16 and 19 respectively, and flattened seats 17 in a manner rigidly connecting said bar, shell and brackets together. In said tube is disposed a current conductor 21 leading out through openings in said seat to the bracket and then to the headlight casings to supply the lamps thereof with current for illumination.

As best shown in Fig. 1, it is apparent that the fenders 4—4 are not only connected together by the structure described, but the shell is also supported thereby as well as the headlight casing, and this without visually presenting to view the real connecting member which is the tubular rod 18. Said rod being disposed in front of the radiator core protects the same against injury in a front end collision or the like and provides a convenient conduit for containing the wiring for the headlights.

While in describing my invention, I have referred in detail to the form, arrangement and construction of the various parts embodied therein, I do not wish to be limited thereto except as may be pointed out in the appended claims.

I claim as my invention:

1. An automobile embodying therein front fenders, a radiator between said fenders comprising a core and a shell, a member extending transversely through said shell in front of said core and engaged at its ends with side portions of said shell, brackets arranged between said shell and fenders and secured at one end to the latter and means connecting the other end of said brackets to the ends of said member and also to said side portions of said shell.

2. An automobile embodying therein front fenders, a radiator between said fenders comprising a core and a shell, which shell is provided with a flattened seat at each side thereof, a member disposed in said shell in front of said core and extending between said flattened seats, a bracket disposed between each seat and adjacent fender, each bracket being fixed at one end to the associated fender and means connecting the other end of each bracket with an associated end of said member within the shell and extending through said flattened seats of the shell.

3. An automobile embodying therein front fenders, a radiator between said fenders comprising a core and a shell having a flattened seat at each side thereof, a tubular member within and extending transversely of said shell and having a flange at each end to engage an associated flattened seat, a bracket disposed between each seat and adjacent fender and including a base and an upright headlight supporting part rising from said base, which base is fixed at one end to an associated fender and has a flange at the other end engaged with an associated flattened seat and means extending through said bracket and member flanges and also through said seat for securing them together.

In testimony whereof, I have hereunto set my hand, this 28 day of May, 1929.

CORNELIUS W. VAN RANST.